US007306347B2

(12) United States Patent
Selover

(10) Patent No.: US 7,306,347 B2
(45) Date of Patent: Dec. 11, 2007

(54) MICROPHONE HOUSING CONTAINING AN ILLUMINATION MEANS

(75) Inventor: Michael K. Selover, P.O. Box 6698, Moraga, CA (US) 94570

(73) Assignee: Michael K. Selover, Oakland, CA (US)

(*) Notice: Subject to any disclaimer, the term of this patent is extended or adjusted under 35 U.S.C. 154(b) by 0 days.

(21) Appl. No.: 10/864,192

(22) Filed: Jun. 8, 2004

(65) Prior Publication Data

US 2005/0270782 A1 Dec. 8, 2005

(51) Int. Cl.
*H04M 1/22* (2006.01)

(52) U.S. Cl. ........................................ 362/86; 362/806

(58) Field of Classification Search .................. 362/86
See application file for complete search history.

(56) References Cited

U.S. PATENT DOCUMENTS 1,987,413 A * 1/1935 Olson ........................ 381/361
2,263,668 A 11/1941 Woodworth
2,466,000 A 4/1949 Brown
3,005,905 A * 10/1961 Libson ........................ 362/86
4,354,063 A 10/1982 Kuka
4,618,917 A 10/1986 Lee et al.
5,289,355 A * 2/1994 Cimock ....................... 362/86
5,603,652 A * 2/1997 Rothschild et al. ......... 446/130
5,994,842 A 11/1999 Wong
6,371,637 B1 * 4/2002 Atchinson et al. .......... 362/800
D472,336 S * 3/2003 de Carolis .................. D26/51
6,690,804 B2 2/2004 Everett

FOREIGN PATENT DOCUMENTS

JP 2000-232416 A 8/2000
JP 2000232416 A * 8/2000

* cited by examiner

*Primary Examiner*—Ali Alavi
(74) *Attorney, Agent, or Firm*—Michael A. Glenn; Glenn Patent Group

(57) ABSTRACT

The invention comprises a standard microphone housing including, a standard microphone screen but which is configured to conceal a lighting mechanism. When activated, the light is emitted from the microphone housing through the screen.

6 Claims, 4 Drawing Sheets

MICROPHONE HOUSING CONTAINING AN ILLUMINATION MEANS

BACKGROUND OF THE INVENTION

1. Technical Field

The invention relates to illumination means, such as lamps and the like. More particularly, the invention relates to an illumination means contained within a microphone Housing.

2. Description of the Prior Art

Microphones and lamps are both well known and ubiquitous items.

Inventors in the past have used lighting means in connection with microphones for such purposes as attention getting or illumination of an area about the microphone.

For example, S. Everett, Lighted Microphone Cable Indicator, U.S. Pat. No. 6,690,804 (10 Feb. 2004) shows a lighting apparatus for use with a microphone in a sound mixing system, wherein each microphone in the system has an associated channel. A lighting means is associated with the microphone to assign a particular color to that microphone that associates the microphone with a particular channel. This allows for visual identification of the microphone and this device the light is placed in the microphone cable.

M-k Long, Flashing Light Assembly for a Microphone, U.S. Pat. No. 5,994,842 (30 Nov. 1999) shows a flashing light assembly that's attached to the outside of a microphone in the form of a collar around the microphone shell.

B, Cimock, Portable Lighted Microphone, U.S. Pat. No. 5,289,355 (22 Feb. 1994) shows a portable lighted microphone forming a configuration which outputs light, sound, and color simultaneously. In this device, a clear plastic housing is provided such that light generated within the device escapes the housing. Lighting in connection with this device is provided for entertainment purposes, for example, the light within the microphone is modulated in accordance with music or a user's voice such that the housing the microphone illuminates in time with music or singing.

P. Lee, G. Cheung, J. Yee, Integral Phone Light Accessory, U.S. Pat. No. 4,618,917 (21 Oct. 1986) shows a replacement handset for a standard telephone that has a light producing element in a rim of the microphone element. The light in this case is provided to indicate a status of the handset of the telephone.

J. Kuka, Telephone Handset with Illuminated Magnifier, U.S. Pat. No. 4,354,063 (12 Oct. 1982) shows a telephone handset having a magnifying reading glass lens built into the housing along with electric light bulb positioned to illuminate the field of view of the lens.

M. Libson, Microphone apparatus, U.S. Pat. No. 3,005,905 (24 Oct. 1961) shows a desktop microphone that includes a clear window on the lower portion thereof that contains a point by which illumination may be provided from a lamp contained within the microphone. This particular device is intended for use in connection, for example, with a lectern where a speaker is reading notes. The lamp here directs light downward from the microphone to illuminate the user's notes. A microphone is incorporated with the lamp and therefore functions as a microphone and a lamp.

W. Woodworth, Microphone Support, U.S. Pat. No. 2,263,668 (25 Nov. 1941) shows a microphone stand that provides support both for microphones and for lamps. In the Woodworth device, no attempt is made to distinguish the appearance of the microphone from the lamp, i.e. a standard lamp having a standard lens is provided. Here, the intent is to provide illumination for a lectern, for example for speaker's notes.

C. Brown, PhotoPhone, U.S. Pat. No. 2,466,000 (5 Apr. 1949) discloses a flashlight type device that includes both a transmitter and receiver by which a user may modulate the light, and thereby carry a modulated wave over the light to a similar device that receives and converts said light wave back into an audio signal.

Heretofore, no attempt has been made to provide a novel use of a microphone housing which appears as a microphone but which contains a lighting mechanism.

SUMMARY OF THE INVENTION

The invention comprises a standard microphone housing, including a standard microphone screen, but which is configured to conceal a lighting mechanism. When activated, the light is emitted from the microphone housing through the screen.

DETAILED DESCRIPTION OF THE INVENTION

The invention comprises a standard microphone housing, comprising a standard microphone screen but which is configured to conceal a lighting mechanism. When activated, the light is emitted from the microphone housing through the screen.

Figure 1:
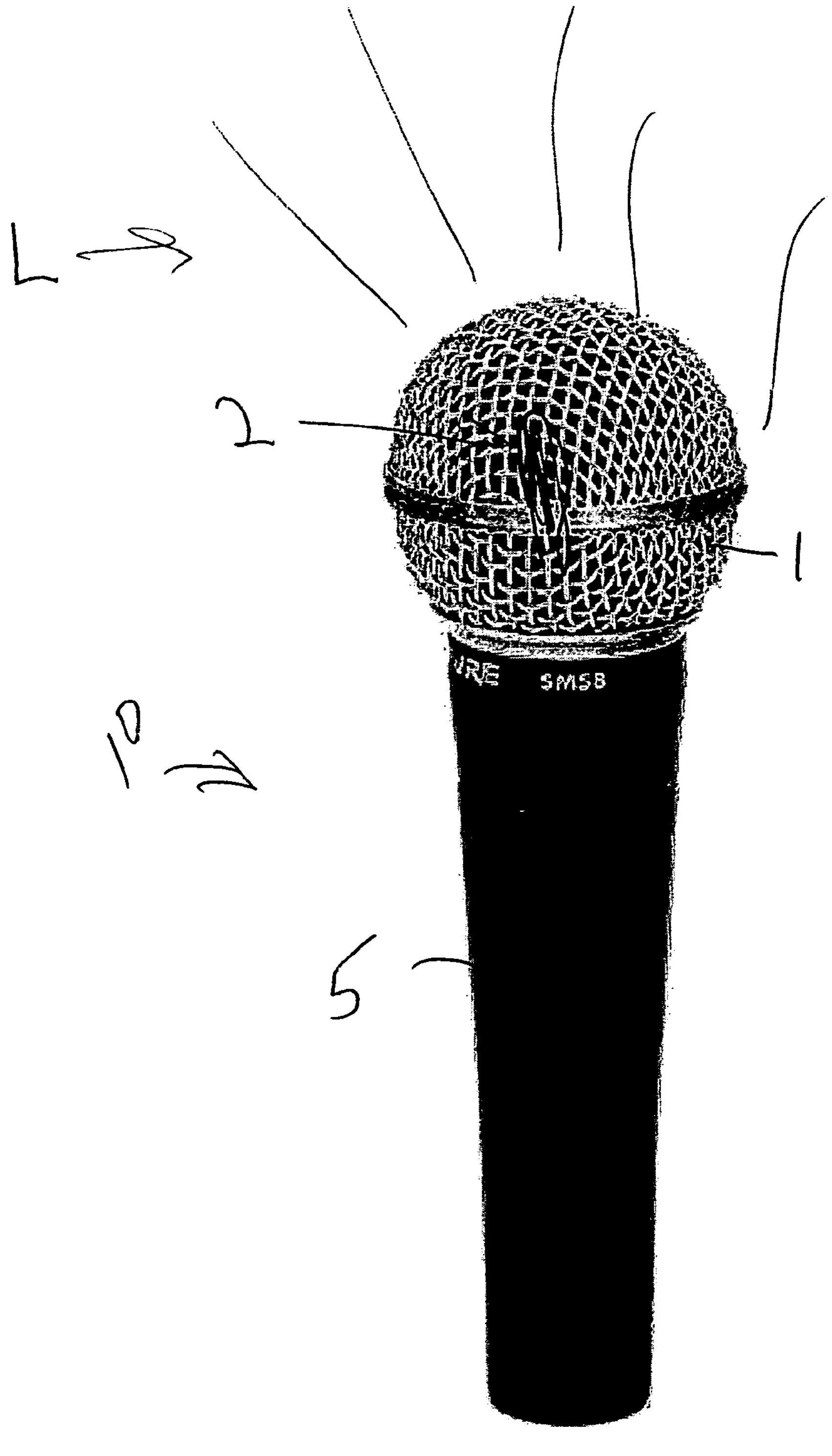
FIG. 1 is a perspective view of a microphone housing that incorporates a lighting means according to the invention.

FIG. 1 shows a microphone 10 having a tubular, conic housing 5. At one end of the housing is an orb shaped microphone screen. Within the housing at the screen (shown in phantom in FIG. 1) is a light source 2. The light source, when activated, emits light that provides illumination L from the screen of the microphone.

Figure 2:
FIG. 2 is a perspective view of a boom type microphone stand which supports a microphone housing that incorporates a lighting means according to the invention.

FIG. 2 shows the use of the microphone 10 in connection with a microphone stand which, in the example shown in FIG. 2, is a boom stand 20. It will be appreciated by those skilled in the art that both the housing, the screen, and the stand (if used) may be of any commonly available known type. Thus, the stand need not be a boom stand of the type shown but can be a standard microphone stand or can be a desk stand. The boom stand shown in FIG. 2, is of particular interest because it provides a light source that is readily positionable. Likewise, the housing shown in FIG. 1 is presently preferred because the screen, unexpectedly, provides a diffusion of the light emitted therefrom, which, surprisingly, reduces glare. That is, a light emitted in accordance with the invention provides a soft illumination. The form factor of a microphone housing and screen makes the light readily affixable to a tripod or other such device, such as the boom shown in FIG. 2. The combination of the boom and the light provides a light source that is readily positioned. For example, the boom may be placed alongside a reading chair or alongside a bed, and a soft source of illumination is readily positioned for use, for example while reading.

Figure 3:
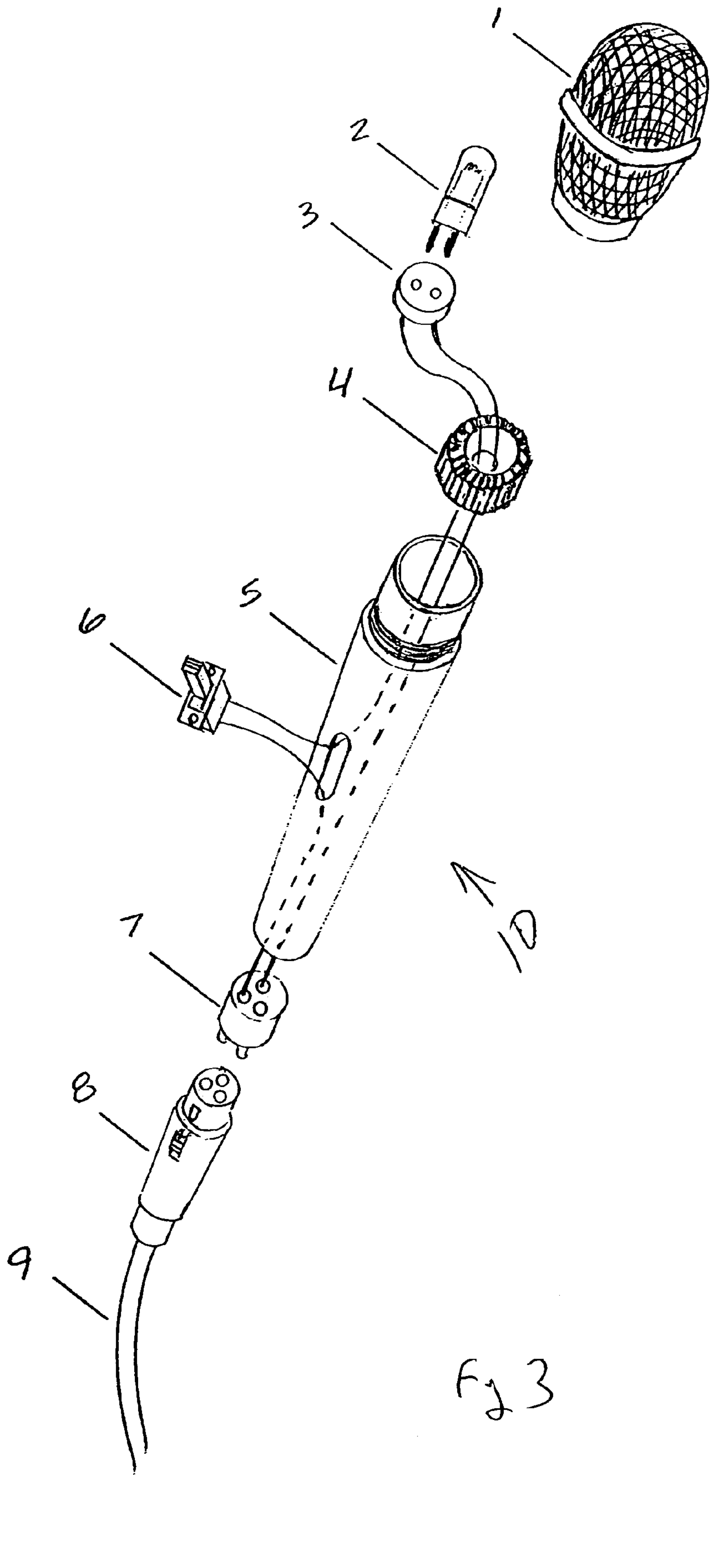
FIG. 3 is an exploded view of a microphone housing and with a lighting means incorporated therein according to the invention.

FIG. 3 is an exploded view of a presently preferred embodiment of the invention. As discussed herein, the invention relates to a lamp that is intended to be used for background and/or ambient lighting, where the lighting mechanism itself is placed within a microphone housing. Such form factor allows the lamp to be used in conjunction with a, for example a microphone stand. The preferred embodiment consists of a 12 volt bulb 2 that is encased in a screen microphone head 1. In the preferred embodiment the mesh of the screen is a double mesh which cuts down on glare. Alternatively, any of various pictures may be inserted between the screen and that bulb to diffuse the light emitted from the lamp. The bulb is a 10 watt halogen bulb. Those skilled in the art will appreciate that other types of bulbs in other voltages may be used, although 12 volt bulbs are readily available and halogen lights provide a good source of light at a low voltage. The preferred bulb is retained in a by pin lamp socket 3. The invention includes a finned aluminum or sprung steel collar 4 that is used to dissipate heat generated by the lamp.

The screen 1 is threadably attached to the microphone housing 5. The housing contains a switch 6 which controls power delivery to the lamp 2. An optional dimmer (not shown) may be provided to allow the intensity of the light to be adjusted as desired. In the present embodiment, standard XLR fittings associated with microphones are used. Thus, an XLR male fitting 7 is provided at the base of the microphone Housing 5 and a cable 9 which carries 12-volt power from a transformer or other 12-volt source includes a female XLR fitting 8.

Figure 4:
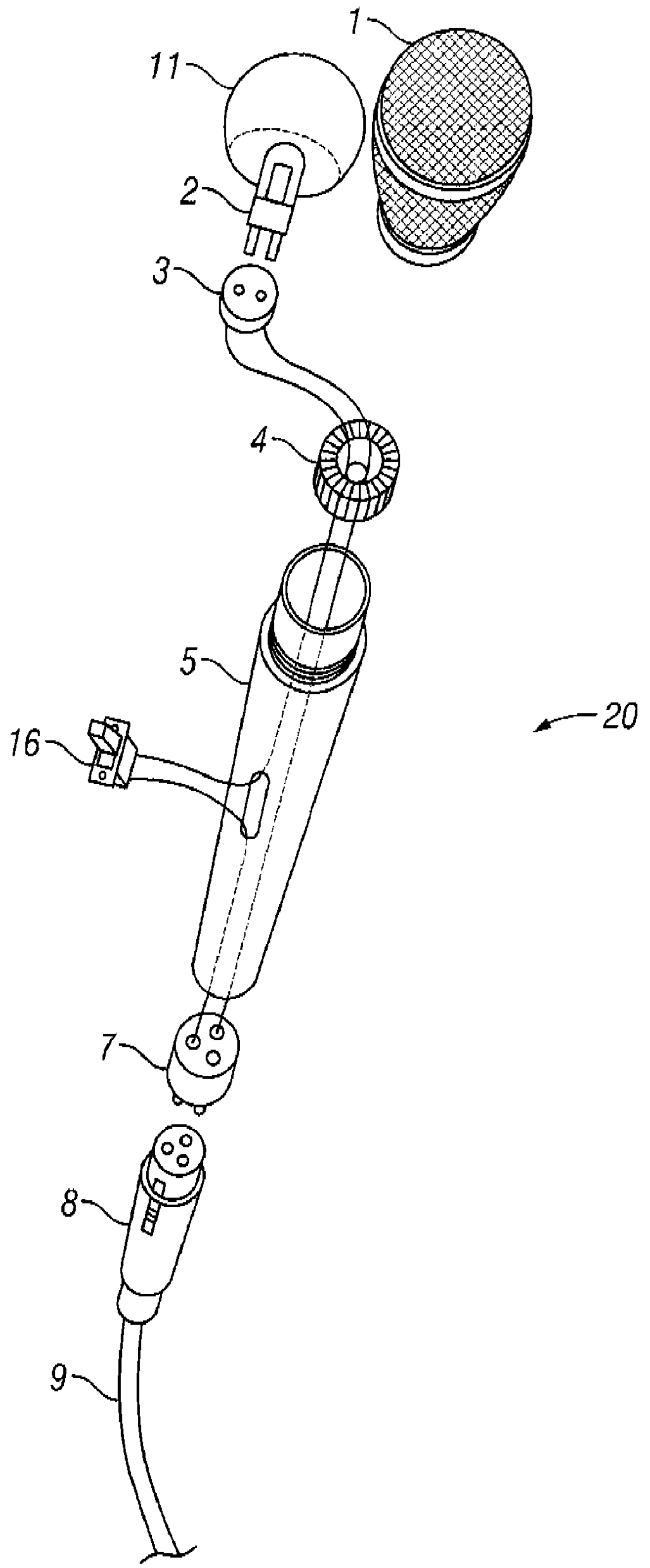
FIG. 4 is a view of an embodiment of the invention having a diffuser positioned between the a light source and a screen according to the invention.

FIG. 4 shows an embodiment of the invention having a diffuser 11 positioned between the light source 2 and the screen 1.

Accordingly, the invention provides a novel and unique lighting source that from all outward appearances, is a microphone and, yet, surprisingly provides a diffuse and variable positionable light source.

Although the invention described herein with references to the preferred embodiment, one skilled in the art will readily appreciate that other applications may be substituted for those set forth herein without departing from the spirit and scope of the invention. Accordingly the invention should be limited by the claims included below.

The invention claimed is:

1. A lamp comprising:

a source of visible light;

a base for retaining said light source;

means for coupling power to said light source; and a housing in which said light source is contained, said housing comprising;

a conventional microphone housing; and a conventional microphone screen, said microphone screen comprising a double mesh orb-shaped screen;

wherein said lamp appears outwardly to be a microphone; and wherein when said light source is activated by applying power thereto, a diffuse light is emitted from said microphone screen.

2. The lamp of claim 1, further comprising:

a heat dissipation mechanism associated with said light source.

3. The lamp of claim 1, further comprising:

a stand.

4. The lamp of claim 3, said stand further comprising:

a microphone boom assembly.

5. The lamp of claim 1, said housing comprising a tubular, conic handle.

6. The lamp of claim 1, further comprising:

a diffusion means positioned between said light source and said screen.

* * * * *